United States Patent
Eberlein et al.

(10) Patent No.: US 11,561,836 B2
(45) Date of Patent: Jan. 24, 2023

(54) OPTIMIZING DISTRIBUTION OF HETEROGENEOUS SOFTWARE PROCESS WORKLOADS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 16/710,714

(22) Filed: Dec. 11, 2019

(65) Prior Publication Data

US 2021/0182108 A1    Jun. 17, 2021

(51) Int. Cl.
| | |
|---|---|
| G06F 9/50 | (2006.01) |
| G06F 9/48 | (2006.01) |
| G06F 11/34 | (2006.01) |
| G06N 20/00 | (2019.01) |
| G06F 11/30 | (2006.01) |

(52) U.S. Cl.
CPC .......... *G06F 9/5027* (2013.01); *G06F 9/4881* (2013.01); *G06F 9/5083* (2013.01); *G06F 11/3006* (2013.01); *G06F 11/3476* (2013.01); *G06N 20/00* (2019.01); *G06F 2209/5019* (2013.01)

(58) Field of Classification Search
CPC .. G06F 9/505; G06F 11/34; G06F 2209/5019; G06F 9/5072
See application file for complete search history.

(56) References Cited

U.S. PATENT DOCUMENTS

| | | | |
|---|---|---|---|
| 2,199,904 | A | 5/1940 | Alburger |
| 7,523,142 | B2 | 4/2009 | Driesen et al. |
| 7,657,575 | B2 | 2/2010 | Eberlein et al. |
| 7,720,992 | B2 | 5/2010 | Brendle et al. |
| 7,739,387 | B2 | 6/2010 | Eberlein et al. |
| 7,971,209 | B2 | 6/2011 | Eberlein et al. |
| 8,126,919 | B2 | 2/2012 | Eberlein |
| 8,200,634 | B2 | 6/2012 | Driesen et al. |
| 8,225,303 | B2 | 7/2012 | Wagner et al. |
| 8,250,135 | B2 | 8/2012 | Driesen et al. |
| 8,291,038 | B2 | 10/2012 | Driesen |
| 8,301,610 | B2 | 10/2012 | Driesen et al. |
| 8,356,010 | B2 | 1/2013 | Driesen |
| 8,375,130 | B2 | 2/2013 | Eberlein et al. |
| 8,380,667 | B2 | 2/2013 | Driesen |
| 8,392,573 | B2 | 3/2013 | Lehr et al. |
| 8,402,086 | B2 | 3/2013 | Driesen et al. |
| 8,407,297 | B2 | 3/2013 | Schmidt-Karaca et al. |
| 8,434,060 | B2 | 4/2013 | Driesen et al. |

(Continued)

OTHER PUBLICATIONS

U.S. Appl. No. 15/874,317, filed Jan. 18, 2018, Eberlein et al.

(Continued)

*Primary Examiner* — Eric C Wai
(74) *Attorney, Agent, or Firm* — Fish & Richardson P.C.

(57) ABSTRACT

A request is received to schedule a new software process. Description data associated with the new software process is retrieved. A workload resource prediction is requested and received for the new software process. A landscape directory is analyzed to determine a computing host in a managed landscape on which to load the new software process. The new software process is executed on the computing host.

20 Claims, 6 Drawing Sheets

(56) References Cited

U.S. PATENT DOCUMENTS

| | | |
|---|---|---|
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,361,326 B2 | 6/2016 | Driesen et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,569,283 B2 | 2/2017 | Eberlein |
| 9,632,802 B2 | 4/2017 | Said et al. |
| 9,633,107 B2 | 4/2017 | Said et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,025,568 B2 | 7/2018 | Mayer et al. |
| 10,055,215 B2 | 8/2018 | Specht et al. |
| 10,061,788 B2 | 8/2018 | Said et al. |
| 10,083,061 B2 | 9/2018 | Odenheimer et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,187,393 B2 | 1/2019 | Odenheimer et al. |
| 10,191,733 B2 | 1/2019 | Driesen |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,311,077 B2 | 6/2019 | Specht et al. |
| 10,437,795 B2 | 10/2019 | Eberlein et al. |
| 10,452,646 B2 | 10/2019 | Schlarb et al. |
| 2006/0171405 A1 | 8/2006 | Brendle et al. |
| 2007/0185720 A1 | 8/2007 | Eberlein et al. |
| 2007/0239800 A1 | 10/2007 | Eberlein |
| 2008/0222248 A1 | 9/2008 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0161648 A1 | 6/2010 | Eberlein et al. |
| 2011/0154445 A1 | 6/2011 | Schmidt-Karaca et al. |
| 2012/0136839 A1 | 5/2012 | Eberlein et al. |
| 2012/0159435 A1 | 6/2012 | Driesen et al. |
| 2012/0023125 A1 | 10/2012 | Driesen et al. |
| 2013/0085810 A1 | 4/2013 | Driesen et al. |
| 2013/0144945 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0117076 A1 | 5/2014 | Eberlein |
| 2014/0149158 A1 | 5/2014 | Odenheimer et al. |
| 2014/0156724 A1 | 6/2014 | Said et al. |
| 2014/0164963 A1 | 6/2014 | Klemenz et al. |
| 2014/0325069 A1 | 10/2014 | Odenheimer et al. |
| 2015/0006608 A1 | 1/2015 | Eberlein et al. |
| 2015/0113539 A1* | 4/2015 | Agarwal ............... G06F 9/5027 718/104 |
| 2015/0188890 A1 | 7/2015 | Said et al. |
| 2015/0220576 A1 | 8/2015 | Eberlein |
| 2015/0220591 A1 | 8/2015 | Eberlein et al. |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0103226 A1 | 4/2017 | Eberlein et al. |
| 2017/0116296 A1 | 4/2017 | Specht et al. |
| 2017/0161291 A1 | 6/2017 | Specht et al. |
| 2017/0161511 A1 | 6/2017 | Eberlein et al. |
| 2017/0264493 A1* | 9/2017 | Cencini ............... H04L 41/0893 |
| 2017/0286467 A1 | 10/2017 | Eberlein et al. |
| 2017/0329505 A1 | 11/2017 | Richter et al. |
| 2017/0344362 A1 | 11/2017 | Burkhardt et al. |
| 2017/0351442 A1 | 12/2017 | Specht et al. |
| 2018/0027060 A1* | 1/2018 | Metsch ............... G02B 6/3897 709/226 |
| 2018/0041568 A1 | 2/2018 | Eberlein |
| 2018/0081668 A1 | 3/2018 | Eberlein |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0144117 A1 | 5/2018 | Engler et al. |
| 2018/0144251 A1* | 5/2018 | Chou ............... H04L 67/10 |
| 2018/0146056 A1 | 5/2018 | Eberlein |

(56) References Cited

U.S. PATENT DOCUMENTS

| | | |
|---|---|---|
| 2018/0268154 A1 | 9/2018 | Specht et al. |
| 2018/0285097 A1 | 10/2018 | Radermacher et al. |
| 2018/0285390 A1 | 10/2018 | Mayer et al. |
| 2018/0300332 A1 | 10/2018 | Odenheimer et al. |
| 2018/0316685 A1 | 11/2018 | Eberlein et al. |
| 2018/0316772 A1 | 11/2018 | Eberlein et al. |
| 2018/0329930 A1 | 11/2018 | Eberlein et al. |
| 2018/0331927 A1 | 11/2018 | Eberlein et al. |
| 2018/0336365 A1 | 11/2018 | Eberlein et al. |
| 2018/0373767 A1 | 12/2018 | Specht et al. |
| 2019/0007420 A1 | 1/2019 | Eberlein et al. |
| 2019/0018874 A1 | 1/2019 | Eberlein et al. |
| 2019/0034460 A1 | 1/2019 | Eberlein |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Schlarb et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Birn et al. |
| 2019/0166209 A1 | 5/2019 | Mueller et al. |
| 2019/0190912 A1 | 6/2019 | De boer et al. |
| 2019/0207922 A1 | 7/2019 | Eberlein |
| 2019/0220289 A1 | 7/2019 | Driesen et al. |
| 2019/0220529 A1 | 7/2019 | Eberlein et al. |
| 2019/0238426 A1 | 8/2019 | Eberlein |
| 2019/0340260 A1 | 11/2019 | Eberlein et al. |

OTHER PUBLICATIONS

U.S. Appl. No. 15/847,627, filed Dec. 19, 2017, Boer et al.
U.S. Appl. No. 15/883,680, filed Jan. 30, 2018, Eberlein.
U.S. Appl. No. 15/970,499, filed May 3, 2018, Eberlein et al.
U.S. Appl. No. 15/983,469, filed May 18, 2018, Driesen et al.
U.S. Appl. No. 15/983,812, filed May 18, 2018, Eberlein et al.
U.S. Appl. No. 15/996,804, filed Jun. 4, 2018, Hauck et al.
U.S. Appl. No. 16/005,927, filed Jun. 12, 2018, Kruempelmann et al.
U.S. Appl. No. 16/173,225, filed Oct. 29, 2018, Eberlein et al.
U.S. Appl. No. 16/197,888, filed Nov. 21, 2018, Meissner et al.
U.S. Appl. No. 16/200,427, filed Nov. 26, 2018, Mueller et al.
U.S. Appl. No. 16/208,920, filed Dec. 4, 2018, Eberlein et al.
U.S. Appl. No. 16/214,724, filed Dec. 4, 2018, Eberlein et al.
U.S. Appl. No. 16/219,358, filed Dec. 13, 2018, Eberlein el al.
U.S. Appl. No. 16/219,371, filed Dec. 13, 2018, Eberlein et al.
U.S. Appl. No. 16/219,375, filed Dec. 13, 2018, Eberlein.
U.S. Appl. No. 16/297,057, filed Mar. 3, 2019, Eberlein.
U.S. Appl. No. 16/402,453, filed May 3, 2019, Eberlein.
U.S. Appl. No. 16/410,076, filed May 13, 2019, Eberlein et al.
U.S. Appl. No. 16/455,072, filed Jun. 27, 2019, Eberlein et al.
U.S. Appl. No. 16/521,642, filed Jul. 25, 2019, Eberlein et al.
U.S. Appl. No. 16/580,318, filed Sep. 24, 2019, Eberlein et al.
U.S. Appl. No. 16/688,941, filed Nov. 19, 2019, Auer et al.
Tutuorialspoint.com[Online],"OS Memory Allocation Q & A #2" created on Dec. 24, 2015 [Retrieved on Dec. 11, 2019], retrieved from: URL www.tutorialspoint.com/operating_system/os_memory_allocation_qa2.htm>, 1 page.

\* cited by examiner

OPTIMIZING DISTRIBUTION OF HETEROGENEOUS SOFTWARE PROCESS WORKLOADS

BACKGROUND

A significant portion of costs associated with running a software process ("process", "service", "application", "task", or "app") in a data center is associated with hardware resources. However, software process typically do not fully utilize all hardware resources. In traditional on-premise deployments, hardware resources are adjusted to suit specific needs of software processes executing on particular hardware. In cloud-computing environments, adjustments are difficult due to differing software process requirements. Modern cloud-computing architectures permit elastic reactions to workload, but not all software processes are configured to leverage this functionality. A balance is needed between workload distribution and orchestration to ensure no hardware capacity limits are reached and to maximize hardware utilization.

SUMMARY

The present disclosure describes optimizing distribution of heterogeneous software process workloads.

In an implementation, a request is received to schedule a new software process. Description data associated with the new software process is retrieved. A workload resource prediction is requested and received for the new software process. A landscape directory is analyzed to determine a computing host in a managed landscape on which to load the new software process. The new software process is executed on the computing host.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, distribution of heterogeneous workloads can be optimized. Second, while a significant portion of the costs for running software processes in a data center are hardware-resource-based, described concepts permit software processes running on hardware to better utilize available hardware resources. Third, in cloud-computing environments, sizing, reservation, and dynamic requests for hardware resources can be permitted according to specific needs of software processes. Fourth, described concepts permit efficient use of generic hardware and minimized non-consumed computing resources. Fifth, legacy processes can be executed while minimizing idle hardware capacity. Sixth, a balance can be reached between workload distribution and orchestration to ensure no hardware capacity limits are reached and to maximize hardware utilization.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1A:
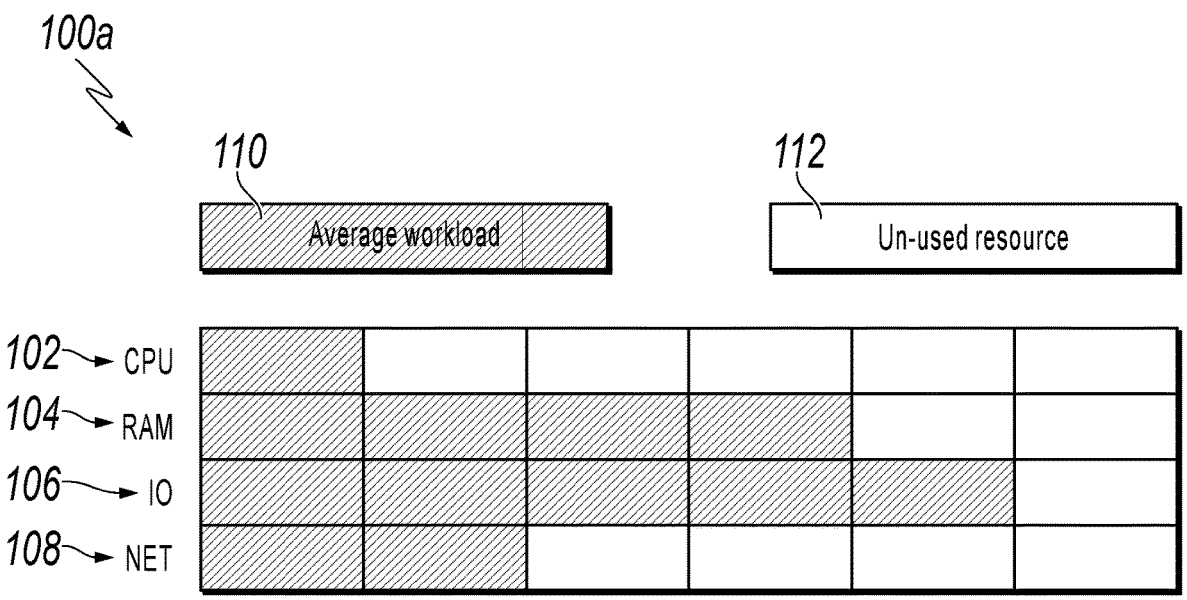
FIG. 1A is a bar chart illustrating a visualization of average workloads associated with a software process, according to an implementation of the present disclosure.

The following detailed description describes optimizing distribution of heterogeneous software process workloads, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A significant portion of costs associated with running a software process in a data center is associated with hardware resources. For example, hardware resources are specified by different parameters associated with a central processing unit (CPU), random access memory (RAM), input/output (TO), graphics processing unit (GPU), or network (NET). However, software processes typically do not fully utilize all hardware resources (that is, software processes do not necessarily use hardware resources/characteristics homogeneously). For example, some software processes are more CPU intensive, others require a large quantity of RAM. In a particular example, some workloads may require 90% CPU but only 10% RAM, where others may require 70% RAM and only 5% CPU. In traditional on-premise deployments, hardware resources are adjusted (or sized) to suit specific needs of software processes executing on particular hardware (for example, more CPU resources, but not as much RAM). In cloud-computing environments, adjustments are difficult due to differing software process requirements.

Workload sizing options are also available in cloud-computing environments, however, different applications types typically have different requirements, and it is difficult to predict which sizing options to reserve and dynamically requesting specific options are significantly more expensive than using reserved instances of a pre-selected option type. Therefore, general purpose machines are normally preferred that can be used for requirements of any application type. But using such generic hardware can be very inefficient, because when applications of the same type are run on a particular set of hardware, application density can be optimized until one parameter reaches a limit. Often here buffers associated with each parameter will be implemented to ensure smooth application operation, even during a dynamic peak load. Even if a parameter reaches its limit, other parameters may still have spare capacity (for example, RAM may be fully utilized, but CPU is still idle to a certain extent), so non-consumed resources can still be considered to be available. In some cases and regardless of consumption status, some resources are paid for, so the lack of consumption is needlessly wasteful.

An additional aspect to consider is a time-characteristic associated with a software process (this is, software processes can be said to be time-dependent). For example, there are software processes that run continuously (for example, databases, application servers, and dispatchers), while other software processes (for example, image document rendering and machine-learning model training) are started particularly to complete a certain action(s) and are then terminated within a relatively short period of time.

Workloads are not always constant over time and a ratio of hardware resources used also varies over time (for example, an in-memory database requires a certain percentage RAM to store data (more or less constantly) but queries executed can require additional RAM and CPU).

A new version of a software process can have different characteristics (such as, an upgrade of a set of running services) that alters hardware resource utilization. As software is routinely upgraded, it is vital to be aware of software process effects on hardware utilization.

While modern cloud-computing architectures permit elastic reactions to workload (for example, CPU, RAM, IO, GPU, or NET) requirements, not all software processes are configured to leverage this functionality. There are still "legacy" applications that need to be executed. For these software processes, a static "long-term" assignment of a software process to resources is performed. Variations in software process use can lead to idle hardware capacity, which can be identified and leveraged for other workload requirements. Assuming hardware prices are relatively fixed and service costs need to be adjustable to entice customers to use the execution environment, less hardware needs to be used in more efficient manner.

Hardware resources are statically configured (that is, a constant ratio of CPU, RAM, IO, GPU, or NET). Hardware can be configured (or re-configured) with different ratio of hardware resources (such as, CPU/RAM and GPU/RAM), but once deployed, the ratio is again considered to be constant. If Internet-as-a-Service (IaaS) services are purchased to execute in an execution environment, it can be argued that configurations with different hardware resource ratios can be consumed, as required, even for short time periods. On the other hand, IaaS providers typically offer a significant discount, if specific configurations are planned for use for longer periods of time (for example, 3 or more years). Thus, the ratio remains relatively constant.

Given static configuration of hardware resources and non-homogenous utilization of hardware resources by software processes, assembly of "dedicated hardware profiles" to be able to efficiently execute multiple types of software processes is expensive and can create wasted single resource types (such as, CPU). While different hardware host machines could be configured focusing on either GPU, SSD, a large ratio of CPU/RAM, or a low ratio of CPU/RAM to be able to later execute specific workloads on dedicated hosts, this practice necessarily creates wasted resources, since more buffer (that is, spare hardware of each hardware configuration) needs to be provided, not all hardware resources will be utilized, and the dynamic of actual demand cannot be properly anticipated.

New and existing customers can also dynamically affect workload at any time (by adding or removing particular workloads), leveraging a promise of elasticity in a cloud-computing platform. This workload increase/decrease can create system provider-side challenges to ensure efficient execution of the customer's software processes.

In some cases, to help with workload allocation planning, workload types can be deployed as "siloed"—meaning having a defined setup with a known workload response. Under the siloed approach, for certain workloads, system operators tend to execute the workloads in a bundled manner (for example, all databases on particular hardware, all application servers on different particular hardware, all machine-learning model training on still different hardware). This practice can ease troubleshooting to a certain extent, as the particular workload type is known.

A balance is needed between workload distribution and software process orchestration to ensure no hardware capacity limits are reached and to maximize hardware utilization, even with competing resource allocation requirements. The enhanced approach described in this disclosure answers the question of how to distribute and orchestrate a workload to ensure that no capacity limits are reached while maximally utilizing hardware to optimize hardware costs for information technology (IT) operations.

Workload characteristics are needed in order to perform the mentioned balance between workload distribution and software process orchestration. For example, in some implementations, a database of key performance indicators (KPIs) can be created. The KPIs can be used to measure previous instances of a software process being scheduled and what workload requirements the software process consumes.

As previously mentioned, software process workload requirements can change between updates, releases, or modifications. The KPI database is updated regularly with actual performance statistics so that for each workload type, a clear understanding exists for demand associated with different workload types.

In some implementations, a resource coordinate system (RCS) is leveraged with the described functionality to address challenges with use of a highly-virtualized environment, such as a cloud-computing environment (for example, executing multiple virtual machines (VM) on multiple physical hardware servers). The RCS bridges a gap between loose context information with respect to physical/concrete resource availability when operating in a virtual environment. For example, when a software process is executed in a cloud-computing environment and an execution container is checked, the virtual environment may report two CPUs and 16 GB of RAM are in use. However, this may be incorrect, because the virtual environment typically provides the resources allocation data in a virtual sense, but may physically provide the reported amount or different amount of the same resources to other execution containers executing on the same physical machine. In some cases, the virtual environment can commit more virtual resources than that are actually physically available, always hoping that no software process is ever actually using all resources to a maximum potential. This method of virtual operation is standard procedure as it is a primary method to reduce hardware and software costs. The problem is that concrete data is needed to accurately balance between workload distribution and software process orchestration. Virtual resource data can result in a loss of context (that is, resource allocation and expected performance is inconsistent). As an example, virtual data may lead a system operator to believe that a software process is executing on two CPUs, but the system operator notices that performance statistics for the software process indicate that the software process is executing extremely slowly. The system operator may erroneously believe that more CPU resources are needed, but this would be incorrect as adding another virtual CPU resource would likely exacerbate, rather than solve, the issue.

While not described in this disclosure with full operational detail, the RCS provides a system operator with relevant data providing vital insight between virtual and physical workload/resource allocation in order to permit resource allocation decisions as described in this disclosure. The RCS can also identify per resource type overbooking as well as spare resources on physical hardware resources.

Output from the RCS can be stored in the previously described KPI database. In some implementations, the KPIs can include both virtual and physical resource allocation data and any other data consistent with this disclosure that can be used to perform the described functionality. Using the data from the RCS, software processes can be analyzed and workload profiles of resource allocation can be built and stored in the KPI database or other computer data stores. The workload profiles can be used to provide actual ("live", "substantially-live", or "nearly-live") workload values for software processes executing in both virtual and non-virtual execution environments. In some implementations, the KPI database or other data stores can be further augmented with data related to the software processes, hardware data, network data, or any other data consistent with this disclosure.

In some implementations, a scheduler or other described systems/processes (for example, refer to FIG. 3) can provide various user interfaces (such as, a graphical user interface (GUI)) to permit configuration of any value described in this disclosure. For example, a "density slider" could be implemented to permit a system operator to adjust a density higher (that is, a more aggressive setting) at a planning time for a workload to more densely pack software processes together on computing equipment (for example, refer to the description of FIGS. 1A & 1B). If resource shortages are encountered, the density slider could be moved to a less aggressive setting to help free up workload resources. Alternatively, and in some implementations, the density value can be entered as a number or in some other manner consistent with this disclosure.

With a traditional approach to define required resources for a software process (e.g. specifications of CPU and RAM resources needed), when executing the software process, an appropriate VM or container is provided meeting the specifications. With the enhanced approach the specifications are replaced by measured resource demand of earlier software process executions.

With a traditional approach to "overbook" hardware, an operating system (OS) and hypervisor/VM monitor (WM) is leveraged to handle overload situations. With the enhance approach, scheduling can be performed in a more efficient manner (independently or in conjunction with the use of the OS/hypervisor/VMM) and overload situations can be reduced.

With the traditional approach to schedule workload(s) on "tailored" hardware which best matches defined demand (for example, hardware with a GPU or hardware with a specific ratio of CPU/RAM), resources must be booked dynamically, which is more costly than a long-term resource allocation. With the enhanced approach, heterogeneous workloads can be better placed on existing computing resources or general-purpose, long-term allocated computing resources.

FIG. 1A is a bar chart illustrating a visualization 100a of average workloads associated with a software process, according to an implementation of the present disclosure. For example, FIG. 1A provides a visualization of CPU 102, RAM 104, IO 106, and NET 108 workloads created by the software process executing on particular computing equipment (for example, a hardware server or a VM). In FIG. 1A, more shaded boxes on the bar chart is equivalent to a higher amount of workload utilization. Workloads are represented in FIG. 1A as an average value ("av"—also refer to FIG. 2A) and Average workload 110 can be considered an aggregate of all workloads. Un-used resource 112 is also illustrated.

In FIG. 1A, it can be seen that a software process is generating (or consuming) little CPU 102 average workload (here, 1 box on the bar chart), while the software process is generating more RAM 104 average workload (here, 4 boxes on the bar chart) and IO 106 average workload (here, 5 boxes on the bar chart). NET 108 average workload is higher than the CPU 102 average workload, but still under average (here, only 2 boxes on the bar chart). In other words, where Average workload 110 is higher (for example, IO 106), Un-used resource 112 is lower, and vice versa.

Figure 1B:
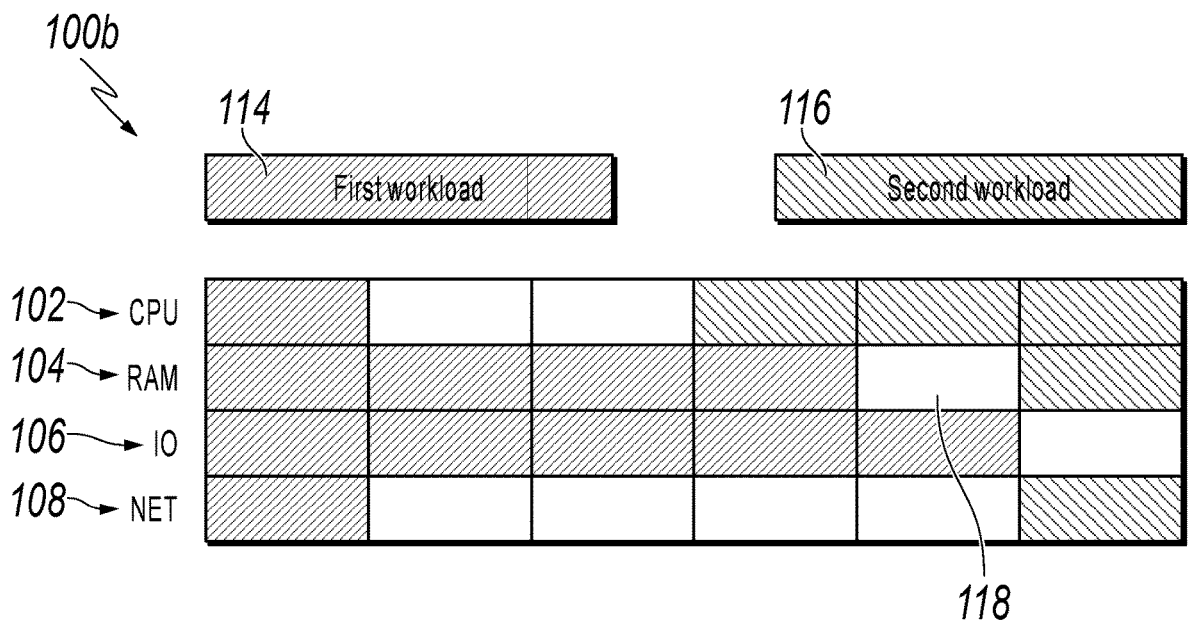
FIG. 1B is the bar chart of FIG. 1A further illustrating a visualization of average workloads associated with two software processes, according to an implementation of the present disclosure.

FIG. 1B is the bar chart of FIG. 1A further illustrating a visualization 100b of average workloads associated with two software processes, according to an implementation of the present disclosure. Here, First workload 114 is equivalent to the Average workload 110 described in FIG. 1A (associated with described software process in FIG. 1A), while a Second workload 116 represents the average workload for an additional executing software process on the particular computing equipment.

As illustrated and as previously described, the First Workload 114 consumes little CPU 102 while consuming more RAM 104. However, the Second Workload 116 consumes more CPU 102, but very little RAM 104. Therefore, these two software process can be "fit" together. In this situation, optimal performance can be achieved because, even with each of the two workloads, a resource buffer exists (for example, buffer 118 for RAM 104) that will permit both workloads to co-exist/co-execute simultaneously on the particular computing equipment (for example, on one virtual machine executing on a hardware server) while maintaining desired performance. In a situation where there are two software processes requiring an equivalent of First workload 114, there would not be enough RAM 104 to satisfy the workload requirements of both software processes. The challenge is to place different workloads on computing equipment with standard resource configurations in order to obtain denser packing, but to require fewer virtual machines of the same type without degradation of performance.

Figure 2A:
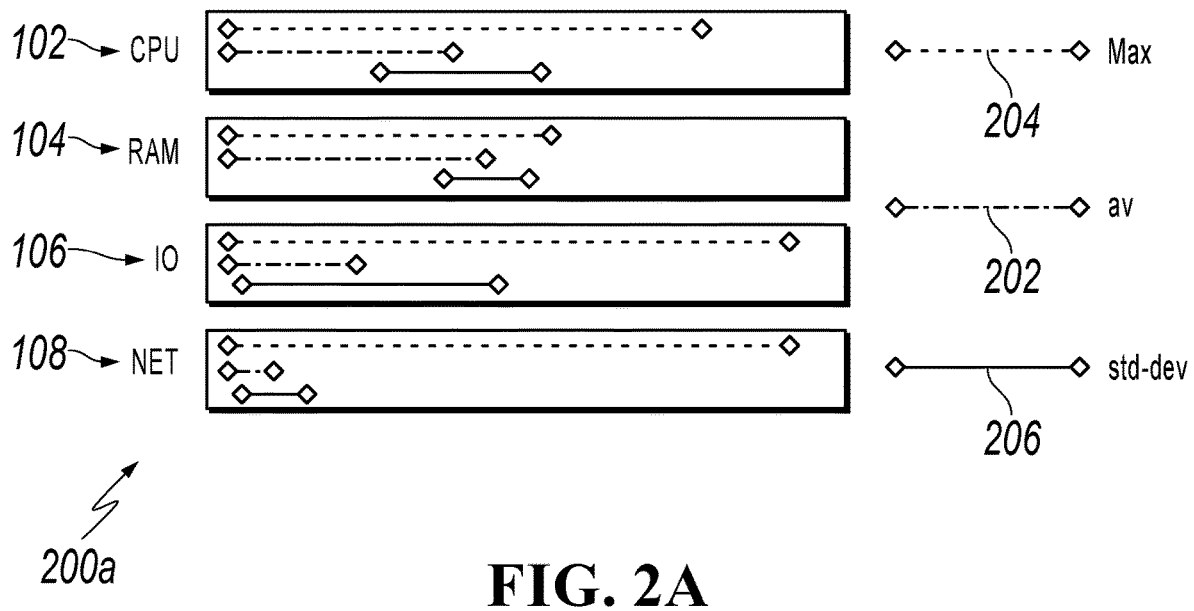
FIG. 2A is a bar chart illustrating an alternative visualization of workloads associated with a software process, according to an implementation of the present disclosure.

FIG. 2A is a bar chart illustrating an alternative visualization 200a of workloads associated with a software process, according to an implementation of the present disclosure. For example, FIG. 2A provides a visualization of CPU 102, RAM 104, IO 106, and NET 108 workloads (as in FIGS. 1A & 1B) created by a software process executing on particular computing equipment. In FIG. 2A, the workloads are granularly represented by graphical indicators for av 202, Max 204, and std-dev 206. Note that av 202 is the unit of measurement for workload used in FIGS. 1A & 1B.

For example, when measuring resource demand of a software process, average (av 202) workload usage parameters can be calculated during runtime of the software process. If the software process is running "long" (for example, 1 h or 8 h), an average per time-slice (that is of 1 or 8 hours) can be calculated. An example set of calculated values could be: CPU–load [cores]: av=2.6; RAM—allocated [megabytes (MB)]: av=145; GPU–load [cores]: av=260. Note that units chosen in this example (that is, cores and MB) are for purposes of understanding. Units can be chosen appropriate to one or more particular resources. In some implementations, units can be configured or dynamically changed by a system operator as desired.

Standard deviation (std-dev 206) of the workload usage parameters can also be calculated. An example set of calculated values could be: CPU–load [cores]: av=2.6, std-dev=1.2, max=5.3; RAM—allocated [MB]: av=145, std-dev=5, max=156; GPU–load [cores]: av=260, stddev=10, max=280. In some cases, when planning where to run a new software process, the std-dev 206 can be added to a planned workload in order to take workload fluctuations into account.

Alternatively, a maximum (Max 204) value (indicating a maximum utilization for a particular workload usage parameter) can be calculated (for example, depending on a resource type). The Max 204 value For example, per resource type, the enhanced procedure can be configured to use "Max value", add "2*std-dev" or "3*std-dev" to the av 202 value to permit a "defensive scheduling" or to use average+std-dev to permit an "aggressive scheduling." As a particular example, overbooking CPU is less problematic than overbooking on RAM (that is, swapping (moving data from RAM to disk-space and vice versa) can slow down a software process considerably and some systems do not even execute when swapping—such as, an in-memory database). Therefore, a typical configuration could be "aggressive" with CPU and "defensive" with RAM.

Figure 2B:
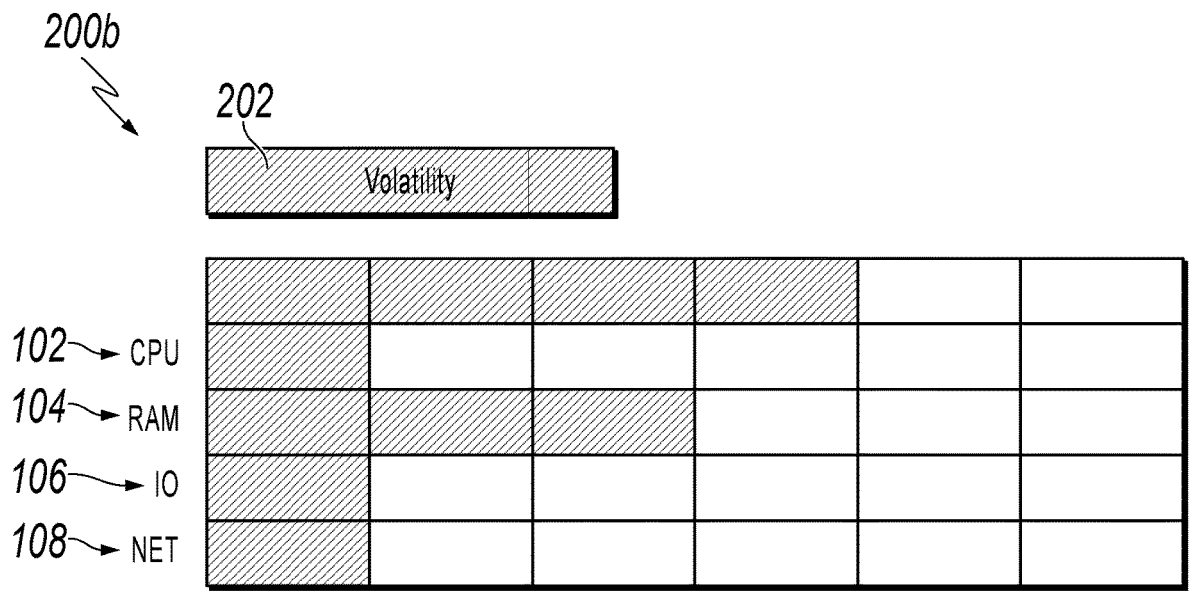
FIG. 2B is a bar chart illustrating workload volatility associated with a software process, according to an implementation of the present disclosure.

FIG. 2B is a bar chart illustrating a visualization 200b of workload volatility associated with a software process, according to an implementation of the present disclosure. For example, FIG. 2B provides a visualization of CPU 102, RAM 104, IO 106, and NET 108 workloads (as in FIGS. 1A, 1B, and 2A).

A computing system often doesn't have a constant consumption of computing resources, as actual consumption of resources can change dynamically. For example, resource consumption volatility can be caused by additional users joining a computing system or batch processes, which can result in resource "spikes." Some workloads have rather constant resource consumption, while others are more volatile.

In some cases, volatility can be used to permit a system operator to fine-tune package density for more aggressive scheduling. For example, there might be 5 or 10 workloads executing on a machine. It is not that extreme if one of the workloads moves to maximum utilization, then a buffer (for example, buffer 118 in FIG. 1B) is still left. But if all workloads move to maximum utilization, then it can be deduced that resources have been over-provisioned and adjustments need to be made. Volatility can be used as a parameter to provide an adjustable overall protection mechanism. The higher the volatility, the more buffer that needs to be reserved.

Figure 3:
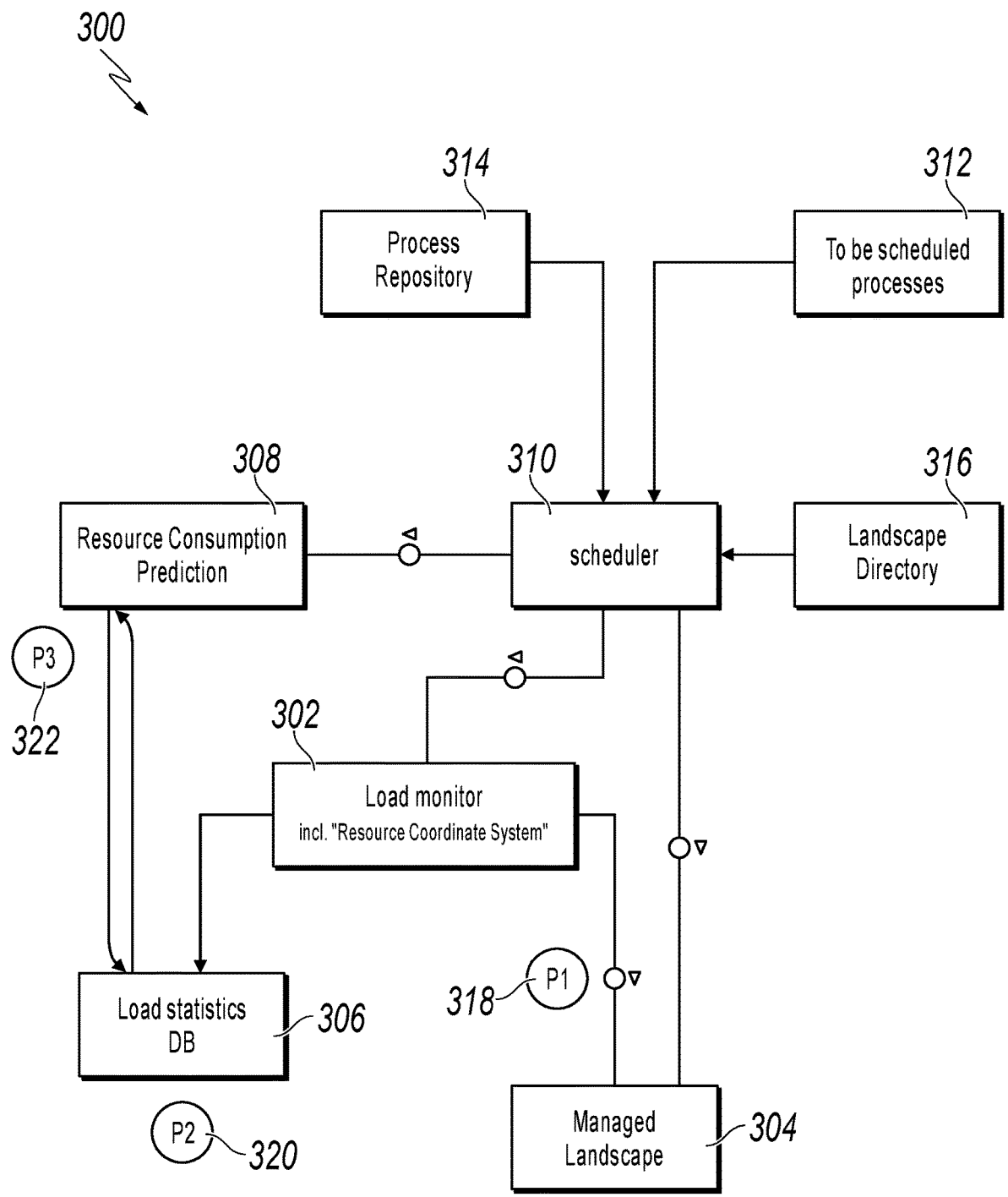
FIG. 3 is a block diagram of a computing system for optimizing distribution of heterogeneous software process workloads, according to an implementation of the present disclosure.

FIG. 3 is a block diagram of a computing system 300 for optimizing distribution of heterogeneous software process workloads, according to an implementation of the present disclosure. FIG. 3 includes a Load monitor 302, Managed landscape 304, Load statistics database (DB) 306, Resource Consumption Prediction 308, scheduler 310, To be scheduled processes 312, Process Repository 314, and Landscape Directory 316. Note that Load monitor 302 utilizes the previously mentioned RCS.

The Process Repository 314 is a database of process types and properties associated with a process type (for example, a PDF rendering process and an in—memory database process. The To be scheduled processes 312 are process instances with references to these types (for example, there are two PDF rendering jobs that need to be scheduled plus four in-memory databases must be launched). As the Load statistics DB 306 captures load per software process type (for example, from the Process Repository 314) and the To be scheduled processes 312 reference the software process types, the Resource Consumption Prediction 308 can derive an expected load for a To be scheduled process 312 from available load statistics information (such as, from the Load statistics DB 306) of the respective software process type.

In typical implementations, process steps P1 318 (the load monitor 302 reads the resource usage every time interval delta-t from the managed landscape 304), P2 320 (the load monitor 302 stores resource usage data per process and time interval delta-t into the load statistics DB 306. In some implementations, the Load monitor 302 also calculates an average, maximum, and standard deviation of the resource usage data and stores the calculated data into the Load statistics DB 306), and P3 322 (resource consumption prediction 308 reads data from the load statistics DB 306 and writes data—e.g. a workload profile—to the load statistics DB 306), run continuously, asynchronously, and independently in the computing system 300. Process P1-P3 is used to regularly retrain a prediction model used by Resource Consumption Prediction 308. The prediction model is updated with new workload statistics. The Load monitor 302 monitors resource consumption of the Managed Landscape 304. Parameterized data received from the Managed Landscape 304 (for example, workload data associated with executing software processes and hardware data) is used by the Load monitor 302 to continuously update the Load statistics DB 306 (refer to FIG. 4, 402). Data from the Load statistics DB 306 is used to continuously update and train the prediction model associated with the Resource Consumption Prediction 308. The prediction model is used to predict workload consumption for a new software process.

At a high-level, implementations of the enhanced procedure, will provide identifiable workload types (for example, by describing a software process to be executed—such as specifying a service-by-name: "PDF—rendering", "In-memory DB—tenant"). The workload resources consumed by the software processes are measured and data stored (for example, process-name and used workload resources.

A workload profile is computed by the Resource Consumption Prediction 308 for the software processes using workload data or a machine-learning prediction model is trained to be able to assign an expected workload profile to a new software process (for example, with a given process—name such as "PDF—rendering"). Based on the computed workload profile or the machine-learning prediction model for the new software process, the new software process is scheduled in the available managed landscape.

Figure 4:
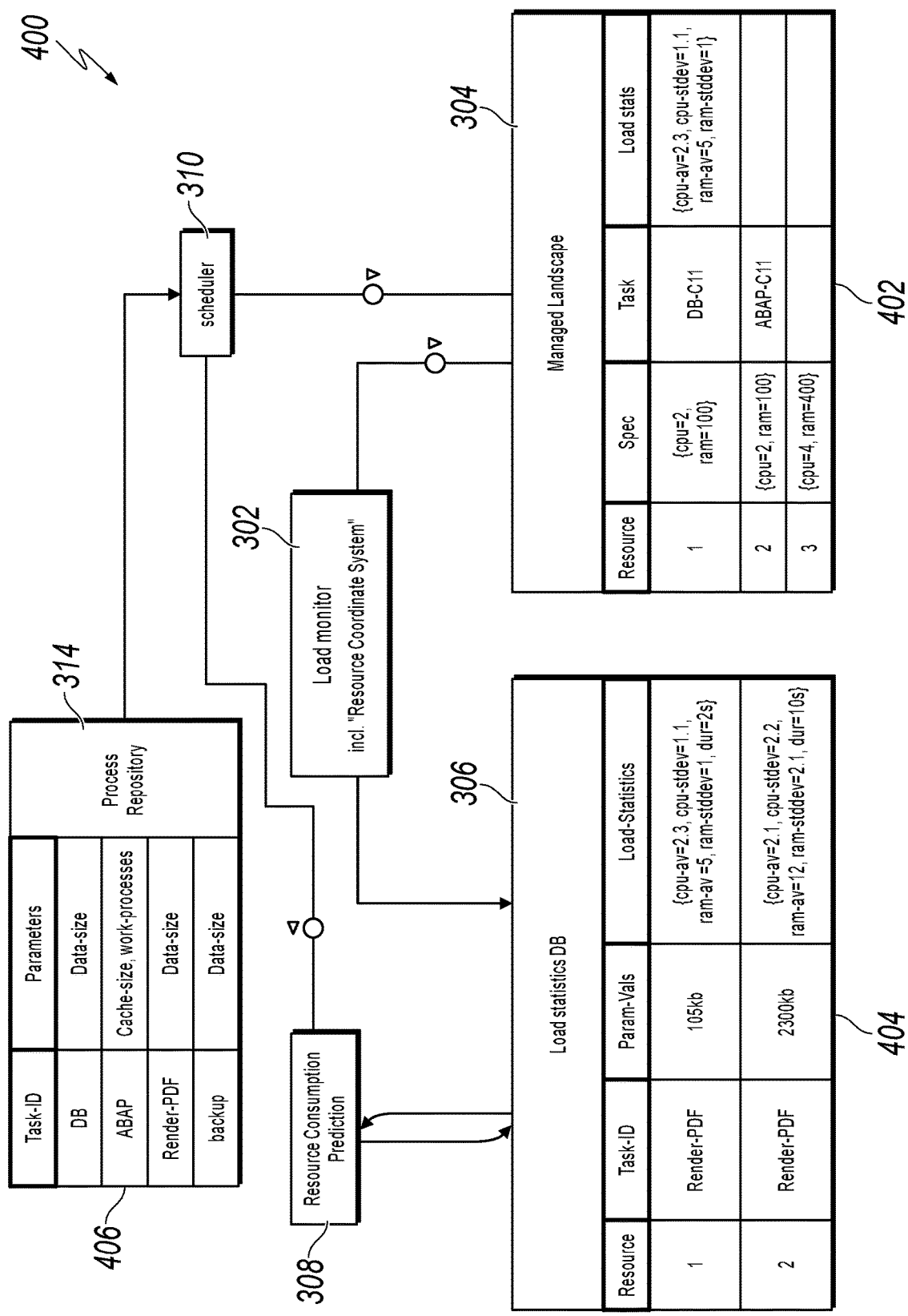
FIG. 4 is a block diagram of the computing system of FIG. 3 including example data used for optimizing distribution of heterogeneous software process workloads, according to an implementation of the present disclosure.

A workload management system (WMS) (considered to be an aggregate of the Resource Consumption Prediction 308, scheduler 310, To be scheduled processes 312, Process Repository 314, and Landscape Directory 316) has knowledge about the Managed Landscape 304 and available hardware configurations (for example, refer to FIG. 4, 404). Additionally, the WMS has knowledge about the current workload of the available managed landscape. The WMS can fit the new software process to the managed landscape according to an algorithm (for example, using "best fit" or "equal distribution"/"next fit"). For a "first fit" algorithm, this enhanced approach would take into account all workload resource types and find the first where all workload resource types fit. For a "best fit" algorithm, the enhanced approach would take into account and compute an average of the fit-assessment and take a highest average. Since RAM is typically the most critical resource, it can be over weighted in computing an average to prioritize a resource with best fitting RAM.

In more detail, when Scheduler 310 is requested to schedule a new software process, the scheduler 310 retrieves new software process identifying/description data from To be scheduled processes 312. The identifying data for the new software process includes dependencies/prerequisites for a software process to start. The dependencies/prerequisites are matched. For example, if software processes need to run in parallel, the processes are planned and a prediction is computed for all of the software processes.

Scheduler 310 requests particular data about the new software process from Process Repository 314 (for example, execution environment, minimum resource requirements, and tasks and associated parameters—refer to FIG. 4 406). For example, the new software process can be required to be executed in an in-memory database.

The scheduler 310 requests that Resource Consumption Prediction 308 compute a "predicted workload" for the to-be-scheduled job. Resource Consumption Prediction 308 returns a predicted load profile for the new software process, which includes parameter(s) for an in-memory database size or other criteria needed to execute the new software process (for example, a 100 GB in-memory database, 200 GB of RAM, and 3 CPU).

The scheduler 310 analyzes the Landscape Directory 316 for which resource in the landscape 304 to start the new software process on. The scheduler 310 updates the Load monitor 302 with data associated with the new software process to permit continuous monitoring of the new software process in the Managed Landscape 304.

The scheduler 310 starts the new software process in the managed landscape (for example, if the software process needs to run on an in-memory database, the software process is started with the configuration to connect to the in-memory database). The new software process executes on the Managed Landscape 304 and is monitored by the Load monitor 302.

FIG. 4 is a block diagram of the computing system of FIG. 3 including example data used for optimizing distribution of heterogeneous software process workloads, according to an implementation of the present disclosure. In some implementations, data 402 is maintained by the Managed Landscape 304, and can include a resource (for example, a host), with a specification (Spec) associated with the host (such as, available RAM and CPUs). Data 402 identifies available resources on the Managed Landscape 304. For a task running on the resource, the Load statistics can be computed (for example, average CPU usage (cpu-av) and standard deviation of CPU usage (cpu-stdev).

In some implementations, Load statistics DB 306 includes data 404. Data 404 can include an identifier of the running task (Run-Id), a Task-ID (the task/software process type, matching to a definition in the Process Repository 314), Parameter-Values for the parameters of the task defined in the Process Repository 314, and the measured Load-Statistics providing data on particular tasks/software processes. Data 402 is updated by the Load monitor 302 and used by Resource Consumption Prediction 308 to train the machine-learning prediction model described in FIG. 3. In some implementations, data 406 is maintained by the Process Repository 314 and can include a Task-ID and associated Parameters. Data 406 is used to provide particular data associated with each type of software process associated with a Task-ID (such as, Cache-size and work-processes associated with ABAP). When a software process is to be scheduled, it can be parametrized. For example, for rendering a PDF, the size of the document is a parameter. The scheduler 310 queries the Resource Consumption Prediction 308 to compute the expected load of a software process with task-id "Render-PDF" with "Data-size" (for example, 105 kilobytes (kb)). The Resource Consumption Prediction 308 has information in the Load statistics DB 306 of processes with Task-ID "Render-PDF" with the parameter values 105 kb and 2300 kb. A prediction can then be made for the new software process to have similar load statistics as the load statistics of the process with Run-Id 1, rendering a PDF of size 105 kb.

In some implementations, an optional extension can be configured with the new approach if a "classical" workload (such as, a single-system operation in a hosted environment) is used. In this case, if tasks are annotated with task types, an extended algorithm can be executed. In some implementations, three process and task types are defined:
  a) Long-running process (for example, with state)—such as, an in-memory DB and application server.
  b) Scheduled task related to a "long running processes"—such as, a backup of a DB, provisioning of a tenant to a DB, deployment of an application/update package to an application server.
  c) Scheduled tasks—such as, PDF rendering or machine-learning prediction model training.

Type b) tasks run within the process of a) and add to a resource consumption of a). If b) tasks are running on their own resources independent of a), they should be characterized as c).

Type a) tasks are distributed with a "capacity planning" process, such as:
  1) Add workload of b) tasks related to a) to get to a workload of ab).
  2) The ab) workloads can be distributed on hardware with the described new approach.

Type c) tasks are distributed to the Managed Landscape 304 (for example, using a "first fit" on multi-dimensions):

1) Get a list of hosts, VMs (that is, a list-of-available-hosts) from the Managed Landscape 304 and respective resources (for example, CPU, GPU, or RAM) with the current load.
2) Loop over the list of hosts:
   i. For each host loop over the list of resources, (for example, start with RAM, NET, TO, GPU, and CPU).
      a. First: add the to-be planned load to the current load.
      b. If the sum of current and planned load is higher than the specification of the resources, remove the host, VM from the list-of-available-hosts.
      c. Identify if for the current host, VM a task of type b) is scheduled.
      d. If yes, then (second) identify, if the to-be planned load has an expected runtime which is longer than the duration until the time from now to the scheduled task of type b).
      e. If both are yes, add the load of the scheduled task to the sum of current and planned load.
      f. If the sum of the current load, planned load of type b) and to-be planned load is higher than the specification of the resource, remove the host, VM from the list-of-available-hosts.
   ii. If a host fits for all resource types, and one wants to use the "first fit" approach, take the host.
   iii. Else continue with the other hosts and compute the weighted average fit.
      a. Remaining is a list of hosts, VMs, which can host also the planned load (even if a scheduled load runs on the host, VM).
      b. For the "best fit" algorithm, take the host with the best weighted average fit.

In some implementations, overload protection mechanisms can be introduced with process/task types. Since it is known, task type c) does not have state, it can be terminated and re-scheduled without loss. In some implementations:
   A mechanism can be introduced to the landscape to monitor the resources workload.
   If one resource is above defined thresholds over an extended period of time, the type c) workload on the resource can be terminated.
   The terminated task is scheduled again on another host in the landscape with more free capacity.

In some implementations, and as previously partially described, an optional extension can be configured if a standard deviation of resource consumption processes is very high where a few parameters can describe the workload (for example, for the document rendering example—the size of the document and for an application server—the configuration for working memory and a number of work-processes. One or more parameters can be added to software processes, captured at a scheduled time, and stored with process measurements in the Load-statistics DB 306.

With the use of parameters, a resource demand prediction for a software process can be computed on a set of data similar to: 1) Process-ID; 2) configuration parameter-values; and 3) resource-measurement. When planning execution of a software process, the scheduler 310 can call the Resource Consumption Prediction 308 and pass the Process-ID and configuration parameter values. The returned prediction includes a resource demand fitting an instance of the software process.

In some implementations, an optional extension (control circuit) can be configured to measure resource utilization, especially an overload situation and process termination and add these data sets to the Load Statistics DB 306 as additional data points for use in optimizing distribution of heterogeneous software process workloads. For example, an overload situation might occur when performance drops due to insufficient computing memory. In this case, paging can occur. Another example can include a software processes taking too long to complete because of insufficient CPU resources or saturated IO resources.

Data for resource demand measurement is extended by information from the previously-mentioned RCS in overload situations. The RCS can measure if a software process is provided with configured resources or if an overload situation occurs. A second source for overload occurrences can be if the scheduler 310 terminates tasks due to high resource demand of a particular type (for example, "type A long running processes" or other type name). The information is added to a measurement for the particular type (for example, the "type A process measurement").

In some implementations, an example algorithmic reaction to improve operation can include:
1) Re-train the model with the latest data sets.
   i. A re-training will result in a new model, taking latest data sets into account.
   ii. If there are changes in process characteristics, a re-training can resolve the problem.
   iii. When a new model is created, it can be run in parallel to the existing model in the scheduling and it can be observed, if the new model provides less aggressive planning (or more aggressive, if the hardware was idle).
   iv. Once the operator is convinced the new model works better, it can be switched.
   v. It can run for a certain period, if the situation becomes worse, the model can be switched back.
   vi. If a new model does not optimize the operation, plan B can be executed:
2) Alter the parameters to make the scheduling less "aggressive".
   i. The scheduler configuration is changed to increase or de-crease density at planning time.
   ii. A change can be observed in execution.
   iii. If the change resulted in a less optimal situation, parameters can be changed back.
   iv. The configuration parameter values shall be captured and stored together with the process resource measurement in the load statistics DB.
3) Alter the algorithm, e.g. use "next fit" instead of "best fit".
   i. The algorithm can be run for a certain period in time and analyze, if the overload situation is occurring less frequently.
   ii. If not, the algorithm can be altered back.

Complexity exists as the optimization is performed in a large-dimensional space and is due to calculating tradeoffs/optimizations between often more than one of RAM, CPU, network bandwidth, IO, and any other resources consistent with this disclosure. Different resource types can also be weighted differently. For example, if memory is exhausted, paging can occur which does not work well with most applications (that is, a lack of 10% memory resources may translate into a 500% slower application). On the other hand, a lack of CPU resources can result in decreased application performance (such as, a 10% lack of CPU resources results in a 10% slower application). Therefore, avoiding low-memory/paging carries a higher-priority when compared to avoiding low CPU resources. These and other considerations consistent with this disclosure can also be included in the described process flows and algorithms.

Figure 5:
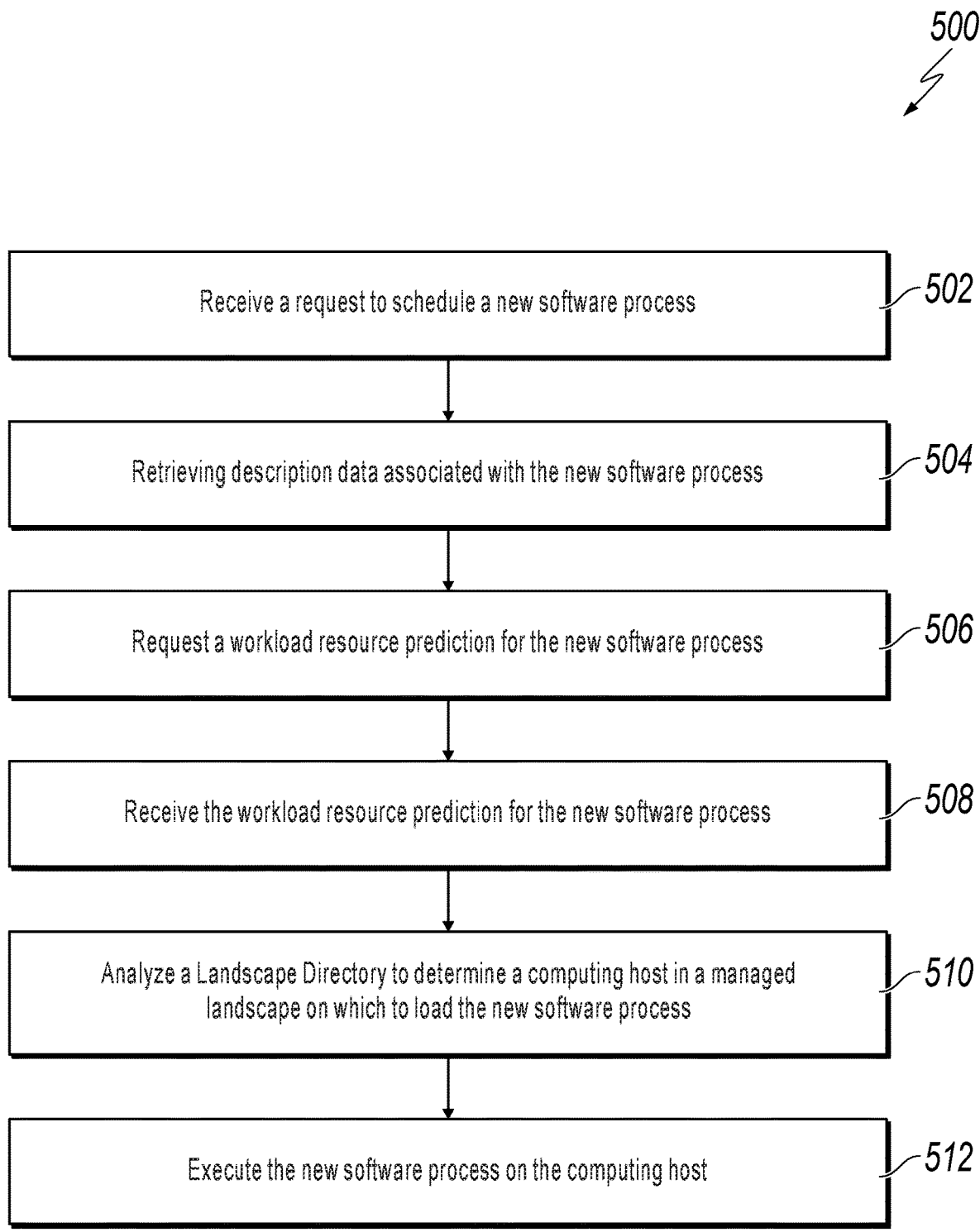
FIG. 5 is a flowchart illustrating an example of a computer-implemented method for optimizing distribution of heterogeneous software process workloads, according to an implementation of the present disclosure.

FIG. 5 is a flowchart illustrating an example of a computer-implemented method 500 for optimizing distribution of heterogeneous software process workloads, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request is received to schedule a new software process.

For a software process similar to the new software process and prior to receiving the request to schedule the new software process, resource usage data is read every time interval delta-t from a managed landscape and stored per process, as stored data into a load statistics database. The stored data is read from the load statistics database. From 502, method 500 proceeds to 504.

At 504, description data associated with the new software process is retrieved. In some implementations, a workload profile is generated, the workload profile is written to the load statistics database, and the workload profile is used to schedule the new software process in the managed landscape. In some implementations, a machine-learning prediction model to predict workload consumption for the new software process. In some implementations, the machine-learning prediction model is continuously updated using data from the load statistics database. In some implementations, calculating an average, maximum, and standard deviation of the resource usage data is calculated and stored into the load statistics database. From 504, method 500 proceeds to 506.

At 506, a workload resource prediction is requested for the new software process. From 506, method 500 proceeds to 508.

At 508, the workload resource prediction is received for the new software process. From 508, method 500 proceeds to 510.

At 510, a landscape directory is analyzed to determine a computing host in a managed landscape on which to load the new software process. In some implementations, a load monitor is updated with data associated with the new software process. From 510, method 500 proceeds to 512.

At 512, the new software process is executed on the computing host. In some implementations, the new software process is continuously monitored in the managed landscape. After 512, method 500 can stop.

Figure 6:
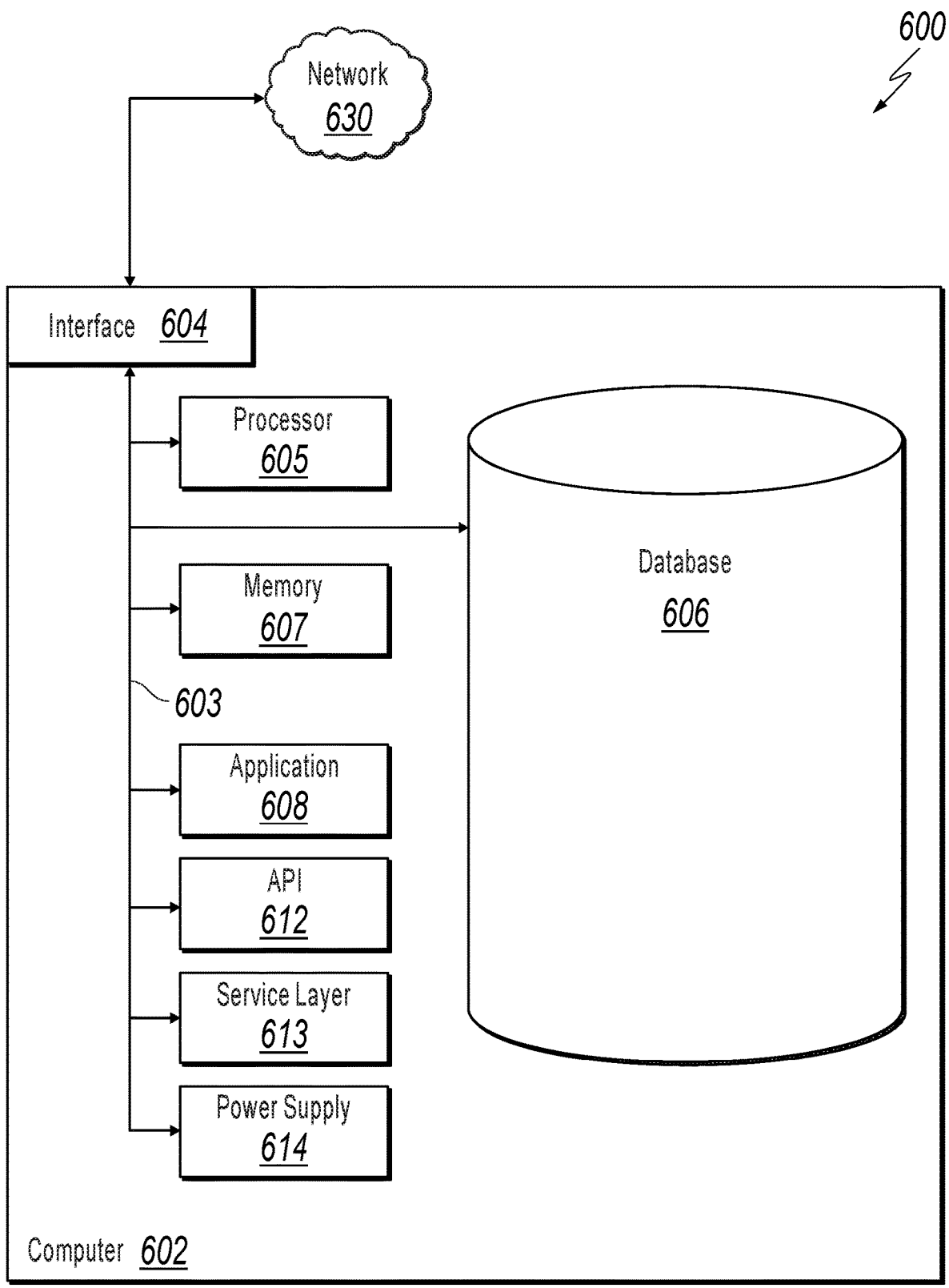
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 can hold one or more of the previously described data types.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: receiving a request to schedule a new software process; retrieving description data associated with the new software process; requesting a workload resource prediction for the new software process; receiving the workload resource prediction for the new software process; analyzing a landscape directory to determine a computing host in a managed landscape on which to load the new software process; and executing the new software process on the computing host.

The foregoing and other described implementations can each, optionally, include one or more of the following features:

A first feature, combinable with any of the following features, further comprising, for a software process similar to the new software process and prior to receiving the request to schedule the new software process: reading resource usage data every time interval delta-t from a managed landscape; storing, as stored data, the resource usage data per process and the time interval delta-t into a load statistics database; and reading the stored data from the load statistics database.

A second feature, combinable with any of the previous or following features, further comprising: generating a workload profile; writing the workload profile to the load statistics database; and using the workload profile to schedule the new software process in the managed landscape.

A third feature, combinable with any of the previous or following features, further comprising training a machine-learning prediction model to predict workload consumption for the new software process.

A fourth feature, combinable with any of the previous or following features, further comprising continuously updating the machine-learning prediction model using data from the load statistics database.

A fifth feature, combinable with any of the previous or following features, further comprising: calculating an average, maximum, and standard deviation of the resource usage data; and storing the average, maximum, and standard deviation of the resource usage data into the load statistics database.

A sixth feature, combinable with any of the previous or following features, further comprising: updating a load monitor with data associated with the new software process; and continuously monitoring the new software process in the managed landscape.

Other implementations can be made using a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium. These implementations can each also, optionally include one or more of the previously described features of the computer-implemented method.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a request to schedule a new software process;
   retrieving description data associated with the new software process, the description data comprising a reference to a process type of the new software process;
   requesting a workload resource prediction for the new software process based on the description data;
   receiving the workload resource prediction for the new software process, the workload resource prediction indicating an expected memory and processor usage to execute the new software process;
   analyzing a landscape directory to determine a computing host in a managed landscape on which to load the new software process, the computing host being determined based on processing capabilities of hosts relative to ongoing workloads within the managed landscape to execute the new software process according to the workload resource prediction in parallel with compatible ongoing memory and processor usage of coexisting workloads without degradation of process execution performance, the compatible ongoing memory and processor usage of the coexisting workloads being identified based on the expected memory and processor usage to execute the new software process relative to a memory and processor usage capability of the computing host and a designated resource buffer for each of memory and processor usage capability allocated from the memory and processor usage capability of the computing host; and
   executing the new software process on the computing host.

2. The computer-implemented method of claim 1, further comprising, for a software process similar to the new software process and prior to receiving the request to schedule the new software process:
   reading resource usage data every time interval delta-t from a managed landscape;
   storing, as stored data, the resource usage data per process and the time interval delta-t into a load statistics database; and
   reading the stored data from the load statistics database.

3. The computer-implemented method of claim 2, further comprising:
   generating a workload profile;
   writing the workload profile to the load statistics database; and
   using the workload profile to schedule the new software process in the managed landscape.

4. The computer-implemented method of claim 2, further comprising training a machine-learning prediction model to predict workload consumption for the new software process.

5. The computer-implemented method of claim 4, further comprising continuously updating the machine-learning prediction model using data from the load statistics database.

6. The computer-implemented method of claim 2, further comprising:
   calculating an average, maximum, and standard deviation of the resource usage data; and
   storing the average, maximum, and standard deviation of the resource usage data into the load statistics database.

7. The computer-implemented method of claim 1, further comprising:
   updating a load monitor with data associated with the new software process; and
   continuously monitoring the new software process in the managed landscape.

8. A non-transitory, computer-readable medium storing one or more instructions executable by a computer system to perform operations comprising:
   receiving a request to schedule a new software process;
   retrieving description data associated with the new software process, the description data comprising a reference to a process type of the new software process;
   requesting a workload resource prediction for the new software process based on the description data;
   receiving the workload resource prediction for the new software process, the workload resource prediction indicating an expected memory and processor usage to execute the new software process;
   analyzing a landscape directory to determine a computing host in a managed landscape on which to load the new software process, the computing host being determined based on processing capabilities of hosts relative to ongoing workloads within the managed landscape to execute the new software process according to the workload resource prediction in parallel with compatible ongoing memory and processor usage of coexisting workloads without degradation of process execution performance, the compatible ongoing memory and processor usage of the coexisting workloads being identified based on the expected memory and processor usage to execute the new software process relative to a memory and processor usage capability of the computing host and a designated resource buffer for each of memory and processor usage capability allocated from the memory and processor usage capability of the computing host; and executing the new software process on the computing host.

9. The non-transitory, computer-readable medium of claim 8, further comprising, for a software process similar to the new software process and prior to receiving the request to schedule the new software process:
reading resource usage data every time interval delta-t from a managed landscape;
storing, as stored data, the resource usage data per process and the time interval delta-t into a load statistics database; and
reading the stored data from the load statistics database.

10. The non-transitory, computer-readable medium of claim 9, further comprising:
generating a workload profile;
writing the workload profile to the load statistics database; and
using the workload profile to schedule the new software process in the managed landscape.

11. The non-transitory, computer-readable medium of claim 9, further comprising training a machine-learning prediction model to predict workload consumption for the new software process.

12. The non-transitory, computer-readable medium of claim 11, further comprising continuously updating the machine-learning prediction model using data from the load statistics database.

13. The non-transitory, computer-readable medium of claim 9, further comprising:
calculating an average, maximum, and standard deviation of the resource usage data; and
storing the average, maximum, and standard deviation of the resource usage data into the load statistics database.

14. The non-transitory, computer-readable medium of claim 8, further comprising:
updating a load monitor with data associated with the new software process; and
continuously monitoring the new software process in the managed landscape.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a request to schedule a new software process;
retrieving description data associated with the new software process, the description data comprising a reference to a process type of the new software process;
requesting a workload resource prediction for the new software process;
receiving the workload resource prediction for the new software process, the workload resource prediction indicating an expected memory and processor usage to execute the new software process;
analyzing a landscape directory to determine a computing host in a managed landscape on which to load the new software process, the computing host being determined based on processing capabilities of hosts relative to ongoing workloads within the managed landscape to execute the new software process according to the workload resource prediction in parallel with compatible ongoing memory and processor usage of coexisting workloads without degradation of process execution performance, the compatible ongoing memory and processor usage of the coexisting workloads being identified based on the expected memory and processor usage to execute the new software process relative to a memory and processor usage capability of the computing host and a designated resource buffer for each of memory and processor usage capability allocated from the memory and processor usage capability of the computing host; and
executing the new software process on the computing host.

16. The computer-implemented system of claim 15, further comprising, for a software process similar to the new software process and prior to receiving the request to schedule the new software process:
reading resource usage data every time interval delta-t from a managed landscape;
storing, as stored data, the resource usage data per process and the time interval delta-t into a load statistics database; and
reading the stored data from the load statistics database.

17. The computer-implemented system of claim 16, further comprising:
generating a workload profile;
writing the workload profile to the load statistics database; and
using the workload profile to schedule the new software process in the managed landscape.

18. The computer-implemented system of claim 16, further comprising training a machine-learning prediction model to predict workload consumption for the new software process.

19. The computer-implemented system of claim 18, further comprising continuously updating the machine-learning prediction model using data from the load statistics database.

20. The computer-implemented system of claim 16, further comprising:
calculating an average, maximum, and standard deviation of the resource usage data; and
storing the average, maximum, and standard deviation of the resource usage data into the load statistics database.

* * * * *